(12) United States Patent
Orcutt

(10) Patent No.: US 8,429,364 B1
(45) Date of Patent: *Apr. 23, 2013

(54) SYSTEMS AND METHODS FOR IDENTIFYING THE PRESENCE OF SENSITIVE DATA IN BACKUPS

(75) Inventor: Niel Orcutt, Pleasant Grove, UT (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/475,933

(22) Filed: May 18, 2012

Related U.S. Application Data

(63) Continuation of application No. 12/059,822, filed on Mar. 31, 2008, now Pat. No. 8,219,766.

(51) Int. Cl.
*G06F 13/00* (2006.01)
*G06F 13/28* (2006.01)

(52) U.S. Cl.
USPC ............... 711/162; 711/E12.103; 707/640

(58) Field of Classification Search .......... 711/162, 711/E12.103; 707/640
See application file for complete search history.

(56) References Cited

U.S. PATENT DOCUMENTS

| | | | | |
|---|---|---|---|---|
| 8,219,766 | B1* | 7/2012 | Orcutt | 711/162 |
| 2006/0094419 | A1* | 5/2006 | Katou | 455/425 |
| 2006/0271796 | A1* | 11/2006 | Kaimal et al. | 713/194 |
| 2008/0126442 | A1* | 5/2008 | Cisler et al. | 707/204 |

* cited by examiner

*Primary Examiner* — Edward Dudek, Jr.
(74) *Attorney, Agent, or Firm* — ALG Intellectual Property, LLC

(57) ABSTRACT

A computer-implemented method for identifying the presence of sensitive data in a backup may comprise identifying a backup, identifying sensitive data in the backup, creating metadata that identifies the presence of the sensitive data in the backup, and associating the metadata with the backup. In addition, a method for preventing sensitive data from being placed in a backup may comprise identifying a file, identifying sensitive data in the file, and preventing the file from being placed in a backup. Corresponding systems and computer-readable media are also disclosed.

17 Claims, 8 Drawing Sheets

SYSTEMS AND METHODS FOR IDENTIFYING THE PRESENCE OF SENSITIVE DATA IN BACKUPS

CROSS REFERENCE TO RELATED APPLICATION

This application is a continuation of U.S. application Ser. No. 12/059,822, filed 31 Mar. 2008, the disclosure of which is incorporated, in its entirety.

BACKGROUND

Conventional security software may identify the presence of sensitive data (such as social security numbers, bank account information, or user login information) in computer files by detecting patterns (also known as digital signatures) that indicate the presence of the sensitive data. If a security software program detects a pattern in a computer file that indicates that the file contains sensitive data, the security software program may prevent the file from being copied or sent to an unauthorized location. For example, the security software may prevent a user from sending a file containing sensitive data in an email, from uploading the file to the Internet, or from using the file in some other way that violates a security policy.

Unfortunately, if a file containing sensitive data is placed in a backup, conventional security software programs may be unable to detect the presence of the sensitive data in the backup. For example, conventional backup software programs typically encrypt and/or compress data in backups using proprietary encryption and/or compression algorithms or heuristics. Because many security software programs are unable to decrypt and/or uncompress data in a backup that has been encrypted or compressed using such proprietary algorithms or heuristics, security software programs may be unable to detect the presence of the sensitive data in the backup. Thus, a user of a computing device may be able to circumvent (either intentionally or unknowingly) a security policy that prevents copying or distributing files containing sensitive data simply by placing a file containing the sensitive data in an encrypted and/or compressed backup.

SUMMARY

As will be described in greater detail below, the instant disclosure generally relates to systems and method for identifying, using metadata, the presence of sensitive data in a backup. Systems and methods for preventing sensitive data from being placed in a backup are also disclosed.

For example, a method for identifying the presence of sensitive data in a backup may comprise: 1) identifying a backup, 2) identifying sensitive data in a backup, 3) creating metadata that identifies the presence of the sensitive data in the backup, and 4) associating the metadata with the backup. In one example, sensitive data in the backup may be identified by scanning the contents of the backup (such as files contained in the backup) for sensitive data before encrypting and/or compressing the backup. In an additional example, sensitive data in the backup may be identified by scanning a file for sensitive data before it is added to the backup.

In one example, the metadata may be associated with the backup by storing the metadata as a portion of the backup. In an additional example, the metadata may be associated with the backup by storing the metadata in a separate file from the backup and associating the separate file with the backup.

The metadata associated with the backup may identify the presence of sensitive data in the backup in a variety of ways. In one example, the metadata may contain a copy of a pattern or digital signature that identifies the sensitive data. The metadata may also contain information that identifies at least one characteristic of the sensitive data in the backup, such as the location of the sensitive data (such as the name of the file containing the sensitive data) and/or the nature of the sensitive data. The metadata may be encrypted, unencrypted, compressed, or uncompressed. For example, the metadata may be stored in an unencrypted and uncompressed format with the backup, even if the backup is stored in an encrypted and compressed format.

In certain embodiments, the method may also comprise transmitting a notification to at least one computing system (such as a server, backend, or a computing system of an administrator) that indicates the presence of sensitive data in the backup.

As detailed above, systems and method for preventing sensitive data from being placed in a backup are also disclosed. For example, sensitive data may be prevented from being placed in a backup by identifying a file, identifying sensitive data in the file, and preventing the file from being placed in a backup. In certain embodiments, a notification may be transmitted to at least one computing system (such as a server, backend, or computing system of an administrator) that indicates the omission of the file from the backup due to the presence of the sensitive data in the file.

Systems and computer-readable media corresponding to the above-described methods are also disclosed. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
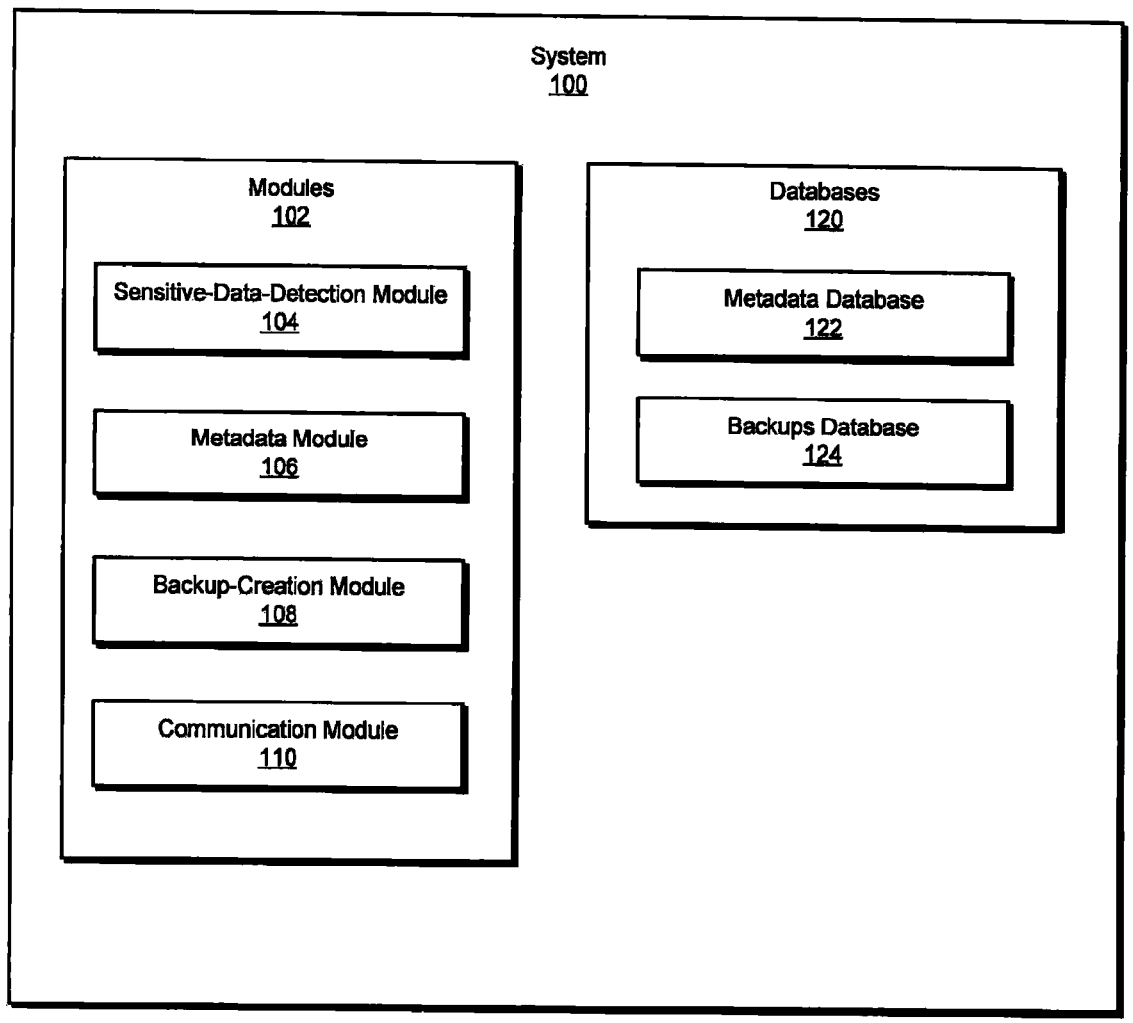
FIG. 1 is a block diagram of an exemplary system for identifying the presence of sensitive data in a backup according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for identifying the presence of sensitive data in a backup. Systems and methods for preventing sensitive data from being placed in a backup are also disclosed. The phrase "sensitive data," as used herein, may refer to information stored in a folder, a file, or any other data that may contain financial information (e.g., bank account information, credit card information, etc.), personal information (e.g., social security numbers, birthdays, passwords), or any other information of a private or sensitive nature.

Figure 4:
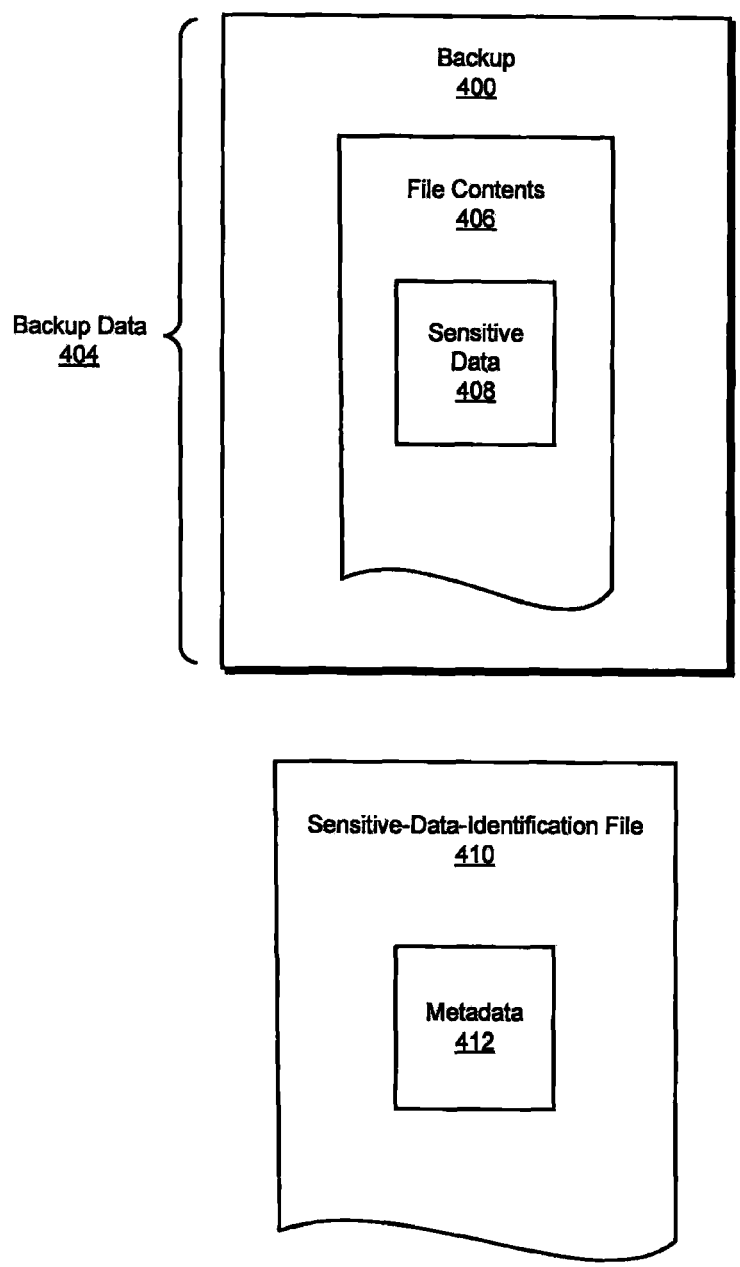
FIG. 4 is a block diagram of an exemplary backup and a separate file containing metadata that indicates the presence of sensitive data in the backup according to at least one embodiment.
Figure 5:
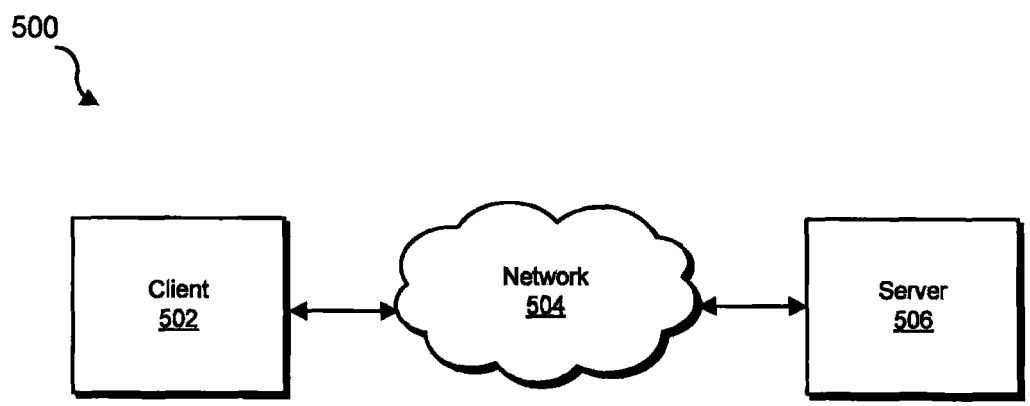
FIG. 5 is a block diagram of an exemplary network-based system for identifying the presence of sensitive data in a backup according to at least one embodiment.

The following will provide, with reference to FIGS. 1 and 5, detailed descriptions of exemplary systems for identifying the presence of sensitive data in a backup and/or preventing sensitive data from being placed in a backup. A description of an exemplary backup containing metadata that indicates the presence of sensitive data will be provided in connection with FIG. 3. In addition, a description of a separate file containing metadata that may indicate the presence of sensitive data in a backup will be provided in connection with FIG. 4. Detailed descriptions of corresponding exemplary computer-implemented methods will also be provided in connection with FIGS. 2 and 6.

FIG. 1 is a block diagram of an exemplary system 100 for identifying the presence of sensitive data in a backup and/or preventing sensitive data from being placed in a backup. As illustrated in this figure, exemplary system 100 may comprise one or more modules 102 for performing one or more tasks. For example, as will be described in greater detail below, exemplary system 100 may comprise a sensitive-data-detection module 104 for identifying or detecting sensitive data in a file or a backup.

Exemplary system 100 may also comprise a metadata module 106 for creating and storing metadata that indicates the presence of sensitive data in a backup. In addition, exemplary system 100 may comprise a backup-creation module 108 for creating a backup containing metadata that identifies the presence of sensitive data in the backup. Exemplary system 100 may also comprise a communication module 110 for facilitating communication between a computing system (such as a user's system) and a server or backend. Although illustrated as separate modules, one or more of modules 102 in FIG. 1 may represent portions of a single module.

As illustrated in FIG. 1, exemplary system 100 may also comprise one or more databases 120. For example, exemplary system 100 may comprise a backups database 124 for storing one or more backups. Exemplary system 100 may also comprise a metadata database 122 for storing, in certain embodiments, files containing metadata that indicate the presence of sensitive data in one or more of the backups stored in backups database 124. Although illustrated as separate devices, one or more of databases 120 in FIG. 1 may represent portions of a single database or a single computing device.

In certain embodiments, one or more of modules 102 may represent one or more software applications or programs that, when executed by a computing device, may cause the computing device to identify the presence of sensitive data in a backup and/or prevent sensitive data from being placed in a backup. For example, as will be described in greater detail below, one or more of modules 102 may represent software modules configured to run on one or more computing devices, such as exemplary computing system 710 in FIG. 7 and/or portions of exemplary network architecture 800 in FIG. 8. One or more of modules 102 may also represent all or portions of one or more special-purpose computers configured to perform one or more tasks required to identify the presence of sensitive data in a backup and/or prevent sensitive data from being placed in a backup.

Figure 2:
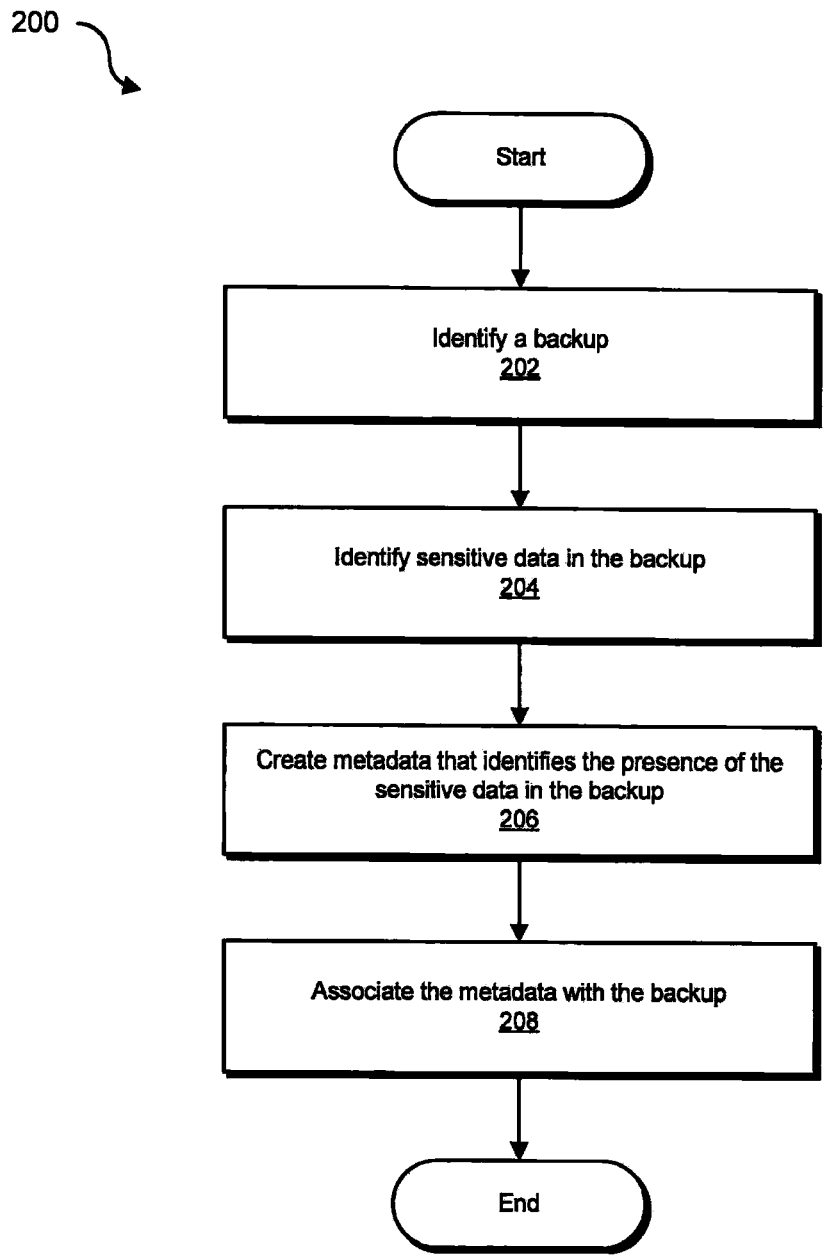
FIG. 2 is a flow diagram of an exemplary computer-implemented method for identifying the presence of sensitive data in a backup according to at least one embodiment.

FIG. 2 is a flow diagram of an exemplary computer-implemented method 200 for identifying the presence of sensitive data in a backup. As illustrated in this figure, at step 202 a backup, such as backup 300 in FIG. 3, may be identified. The term "backup," as used herein, may refer to any type or form of backup of data including, without limitation, a backup of at least a portion of a file, a program, or an entire computing system. Examples of backups include, without limitation, partial backups, full backups (such as snapshots or images), incremental backups, differential backups, or any other suitable mechanism for backing up data.

Figure 3:
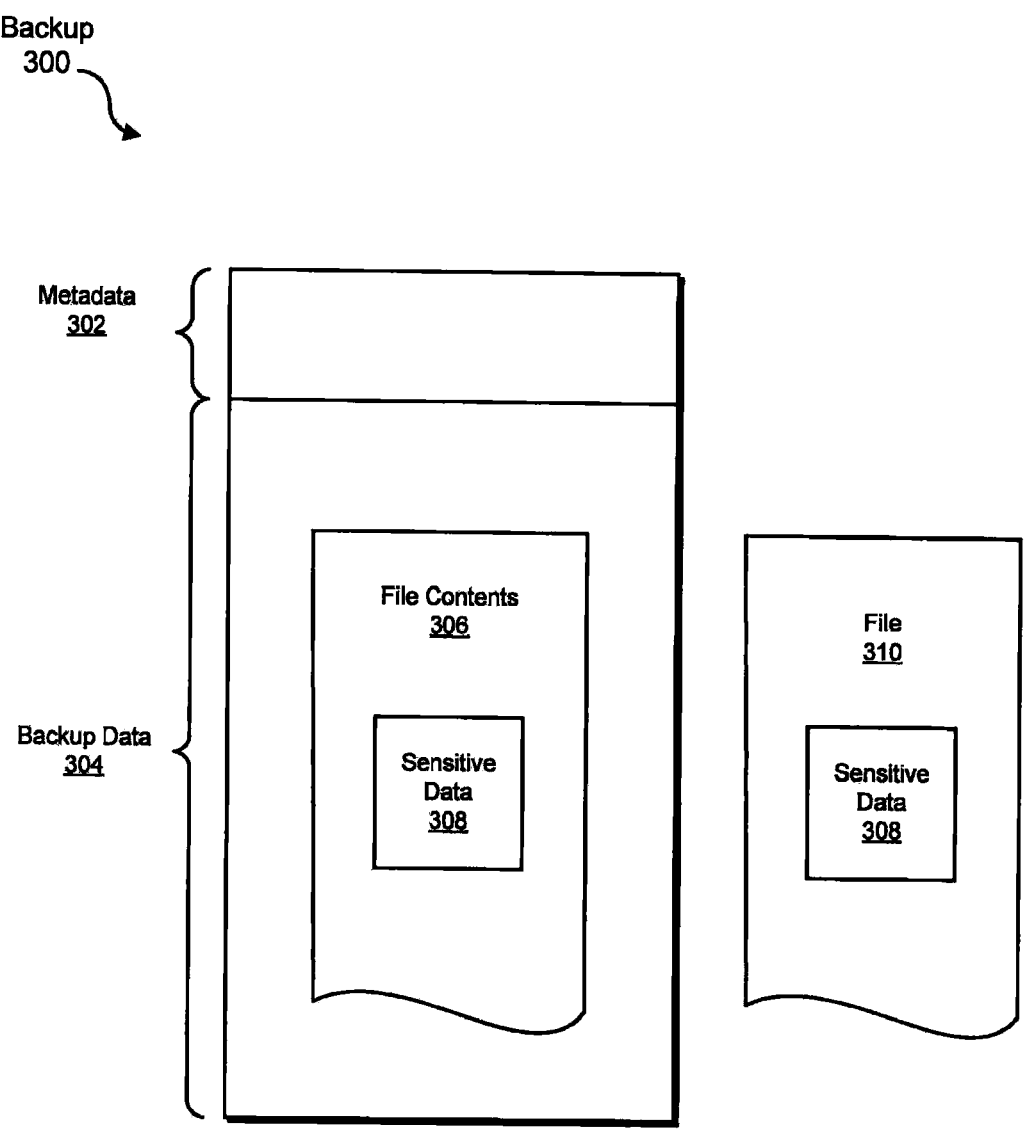
FIG. 3 is a block diagram of an exemplary backup comprising metadata that indicates the presence of sensitive data according to at least one embodiment.

In the example illustrated in FIG. 3, a copy of all or a portion of the contents of a file may be stored in backup 300 as backup data 304. For example, a copy of at least a portion of the contents of a file 310 may be stored as file contents 306 in backup 300. File 310 may represent any type or form of computer file containing data or information. File 310 may be contained within a single data block of a file system or distributed across a plurality of contiguous or non-contiguous data blocks within a file system. For example, a first portion of file 310 may be stored in a first data-block location within a file system, while a second portion of file 310 may be stored in a second data-block location within a file system that is either contiguous or non-contiguous with the first data-block location.

Returning to FIG. 2, at step 204 sensitive data in the backup may be identified. For example, sensitive-data-detection module 104 in FIG. 1 may identify the presence of sensitive data 308 in file contents 306 within backup 300. Step 204 may be performed in a variety of ways. For example, in certain embodiments identifying sensitive data in a backup may comprise identifying a file in an unencrypted backup that contains sensitive data. For example, backup 300 in FIG. 3 may represent an unencrypted and/or uncompressed backup. In this example, sensitive-data-detection module 104 in FIG. 1 may examine backup data 304 of backup 300 (including file contents 306) to determine whether any sensitive data is stored within backup data 304.

In an additional embodiment, step 204 may comprise identifying a file before it is added to a backup, identifying sensitive data in the file, and then adding the file to the backup. For example, sensitive-data-detection module 104 in FIG. 1 may scan file 310 before it is added to backup 300 in FIG. 3 to determine whether file 310 contains sensitive data. Sensitive data may be identified in a variety of ways. For example, the presence of sensitive data in a file or backup may be identified by scanning or searching for patterns (also known as digital signatures) that indicate the presence of sensitive data.

At step 206, metadata that identifies the presence of the sensitive data in the backup may be created. For example, metadata module 106 in FIG. 1 may create metadata that identifies the presence of sensitive data 308 in backup 300. At step 208, the metadata created in step 206 may be associated with the backup. Upon completion of step 208 in FIG. 2, exemplary method 200 may terminate.

Steps 206 and 208 may be performed in a variety of ways. In certain embodiments, creating and associating metadata with a backup may comprise creating metadata and storing the metadata as a portion of the backup. For example, metadata module 106 in FIG. 1 may store, within metadata 302 in FIG. 3, information that identifies the presence of sensitive data 308 within backup 300. Metadata 302 may represent either metadata created by metadata module 106 or preexisting metadata created by an additional module (such as a conventional backup software program).

In an additional embodiment, steps 206 and 208 may comprise creating and storing metadata in a file that is separate and distinct from the backup and then associating the file with the backup. For example, metadata module 106 in FIG. 1 may create a sensitive-data-identification file 410 in FIG. 4 that contains metadata 412 that identifies the presence of sensitive data in backup 400. In this example, metadata 412 may indicate the presence of sensitive data 408 within file contents 406 in backup 400.

In at least one embodiment sensitive-data-identification file 410 may be stored in metadata database 122 in FIG. 1, while backup 400 may be stored in backups database 124. In this example, sensitive-data-identification file 410 (and metadata 412 within file 410) may be associated with backup 400 in a variety of ways. For example, in certain embodiments communication module 110 in FIG. 1 may, after metadata module 106 creates sensitive-data-identification file 410 containing metadata 412, transmit a notification to an additional computing system (such as a server or a computing device of an administrator) that details a relationship between sensitive-data-identification file 410 and backup 400. Sensitive-data-identification file 410 may also be associated with backup 400 by creating an entry within a database table that identifies a relationship between sensitive-data-identification file 410 and backup 400. In this example, such a database entry may be stored in metadata database 122 in FIG. 1.

As detailed above, the metadata created in step 206 in FIG. 2 may identify the presence of sensitive data in a backup or a file stored in the backup. Metadata may indicate the presence of sensitive data in a variety of ways. For example, in certain embodiments metadata 302 in FIG. 3 and/or metadata 412 in FIG. 4 may contain a copy or reproduction of the pattern or digital signature for the sensitive data identified in step 204. Additionally or alternatively, metadata 302 and/or metadata 412 may contain information that identifies at least one characteristic of the sensitive data in the backup. For example, metadata 302 and/or metadata 412 may contain information that identifies a location of the sensitive data (e.g., the name of a file in which the sensitive data is located), the nature of the sensitive data (e.g., whether the sensitive data represents a social security number or bank account information), or any other useful information.

Metadata may be encrypted, unencrypted, compressed, uncompressed, or any combination of the same. For example, metadata 302 in FIG. 3 may be stored in an unencrypted and uncompressed format, even if backup data 304 is stored in an encrypted and compressed format. Similarly, sensitive-data-identification file 410 (and metadata 412 within file 410) may be stored in an unencrypted and uncompressed format, even if backup 400 is stored in an encrypted and compressed format.

As such, metadata 302 and/or metadata 412 may be accessed by conventional computing systems (and/or conventional security software programs) without requiring an understanding of proprietary compression or encryption backup algorithms, heuristics, or techniques.

Although not illustrated in FIG. 2, in certain embodiments exemplary method 200 may also comprise transmitting a notification to at least one computing system that indicates the presence of sensitive data in the backup. For example, upon completion of step 208 in FIG. 2, communication module 110 in FIG. 1 may cause a computing system, such as client 502 in FIG. 5, to transmit a notification to an additional computing system, such as server 506 in FIG. 5. In at least one embodiment, this notification may indicate the presence of sensitive data in a backup, such as backup 300 and/or backup 400, created by client 502 in FIG. 5.

Figure 6:
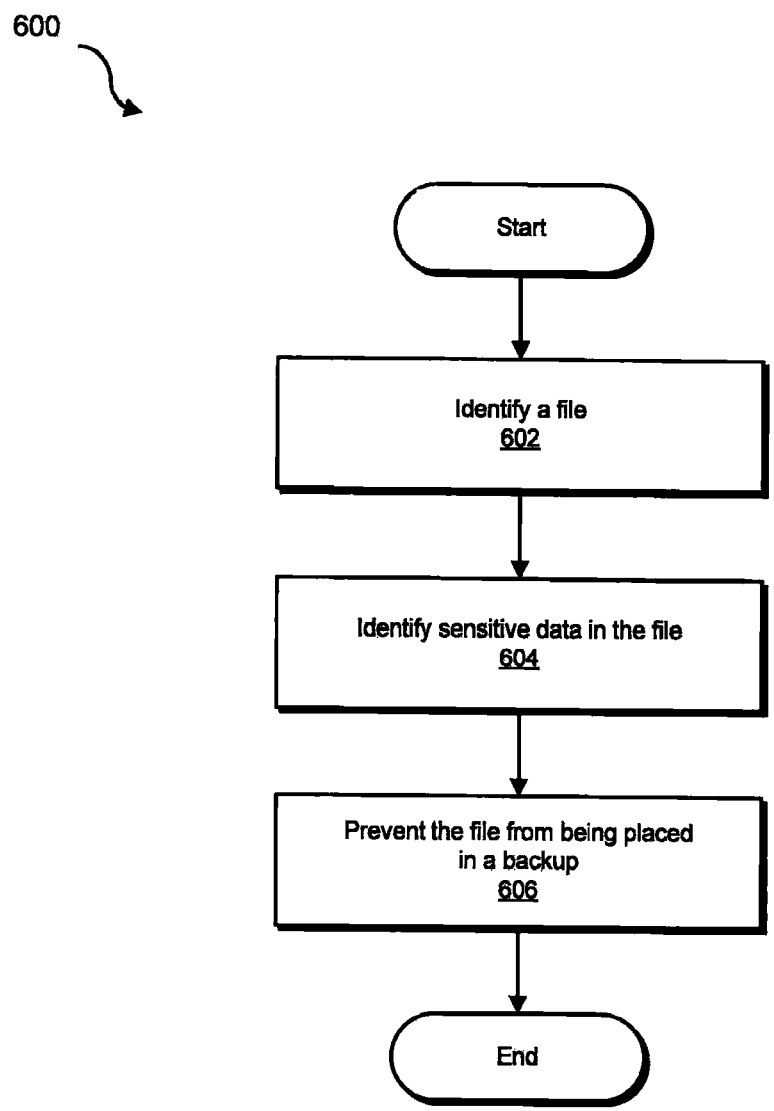
FIG. 6 is a flow diagram of an exemplary computer-implemented method for preventing sensitive data from being placed in a backup according to at least one embodiment.

As detailed above, systems and method for preventing sensitive data from being placed in a backup are also disclosed. FIG. 6 is a flow diagram of an exemplary computer implemented method 600 for preventing sensitive data from being placed in a backup. As illustrated in this figure, at step 602 a file, such as file 310 in FIG. 3, may be identified. At step 604, sensitive data in the file may be identified. For example, sensitive-data-detection module 104 in FIG. 1 may detect sensitive data 308 contained within file 310 in FIG. 3.

At step 606, the file containing the sensitive data may be prevented from being placed in a backup. For example, one or more of modules 102 in FIG. 1 may, after sensitive-data-detection module 104 in FIG. 1 detects sensitive data 308 in file 310, prevent file 310 from being backup up or placed in a backup, such as backup 300 in FIG. 3. Upon completion of step 606 in FIG. 6, exemplary method 600 may terminate.

Although not illustrated in FIG. 6, exemplary method 600 may also comprise transmitting a notification to at least one computing system that indicates the omission of the file identified in step 602 from a backup due to the presence of sensitive data in the file. For example, communication module 110 in FIG. 1 may, after sensitive-data-detection module 104 detects sensitive data 308 in file 310 in FIG. 3, cause client 502 in FIG. 5 to transmit a notification to server 506. This notification may indicate that file 310 in FIG. 3 has been omitted from backup 300 due to the presence of sensitive data 308 in file 310.

Exemplary system 100 in FIG. 1 may be deployed in a variety of ways. For example, all or a portion of exemplary system 100 may represent portions of a network-based system. FIG. 5 is an illustration of an exemplary network-based system 500 for identifying the presence of sensitive data in a backup and/or preventing sensitive data from being placed in a backup. As illustrated in this figure, exemplary system 500 may comprise a client 502 in communication with a server 506 via a network 504.

Client 502 generally represents any type or form of client-side computing device, such as a user's computing device, capable of executing computer-readable instructions. In certain embodiments, client 502 may comprise one or more portions of exemplary system 100 in FIG. 1. For example, one or more of modules 102 in FIG. 1 may be stored and configured to run on client 502.

In at least one embodiment, client 502 may communicate with server 506 via network 504. Network 504 generally represents any type or form of communication or computing network; including, for example, an intranet, a wide area network (WAN), a local area network (LAN), a personal area network (PAN), or the Internet.

As illustrated in FIG. 5, exemplary system 500 may also comprise a server 506. Server 506 generally represents any type or form of server-side computing device, such as a backend. In certain embodiments, server 506 may comprise one or more portions of exemplary system 100 in FIG. 1. For example, one or more of modules 102 from FIG. 1 may be stored and configured to run on server 506.

Figure 7:
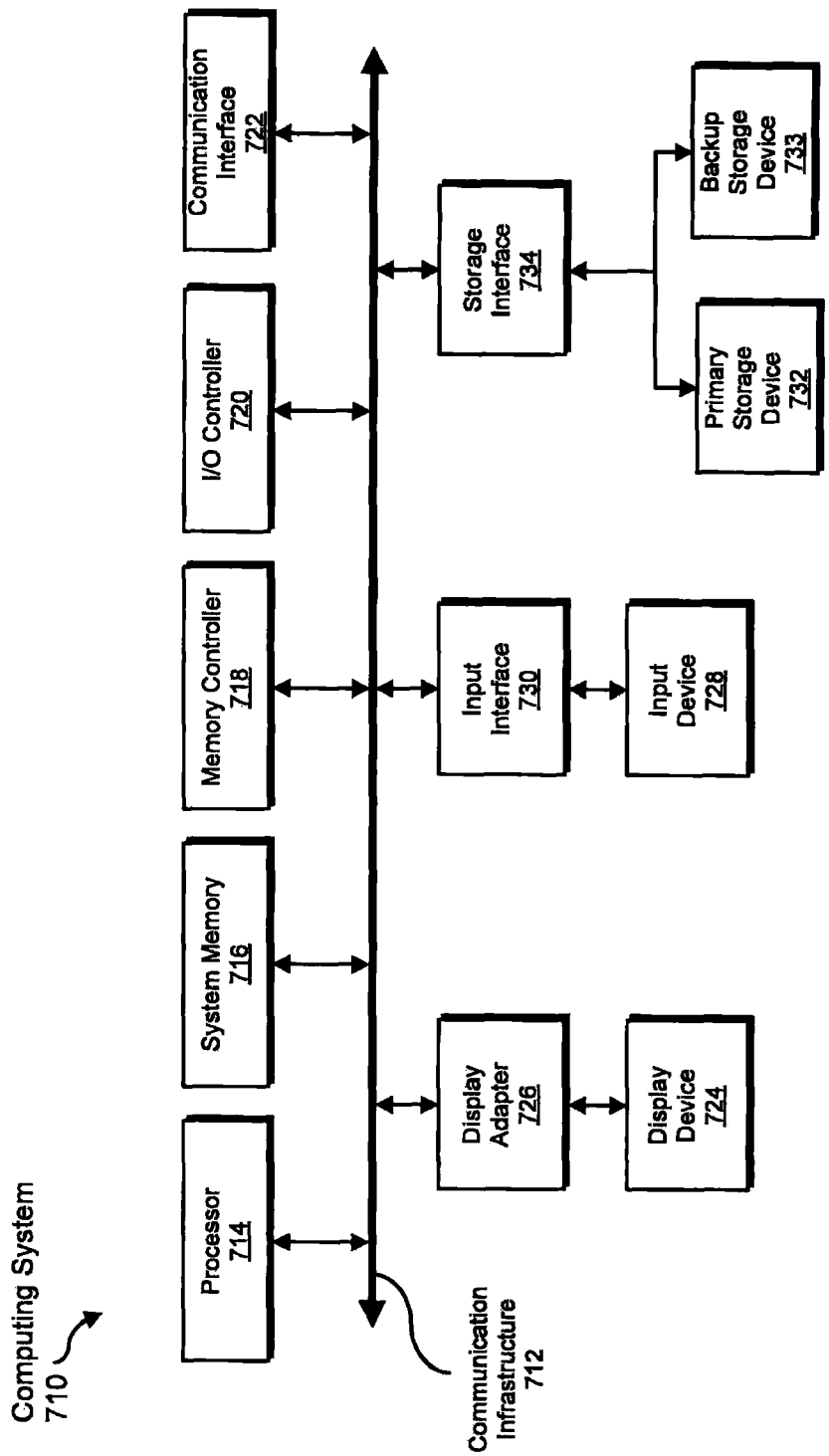
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, creating, associating, scanning, adding, storing, transmitting, and preventing steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as identifying, creating, associating, scanning, adding, storing, transmitting, and preventing.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for identifying, creating, associating, scanning, adding, storing, transmitting, and preventing steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, creating, associating, scanning, adding, storing, transmitting, and preventing steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, creating, associating, scanning, adding, storing, transmitting, and preventing steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, the exemplary file systems disclosed herein may be stored on primary storage device 732, while the exemplary file-system backups disclosed herein may be stored on backup storage device 733. Storage devices 732 and 733 may also be used, for example, to perform and/or be a means for performing, either alone or in combination with other elements, one or more of the identifying, creating, associating, scanning, adding, storing, transmitting, and preventing steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 8 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
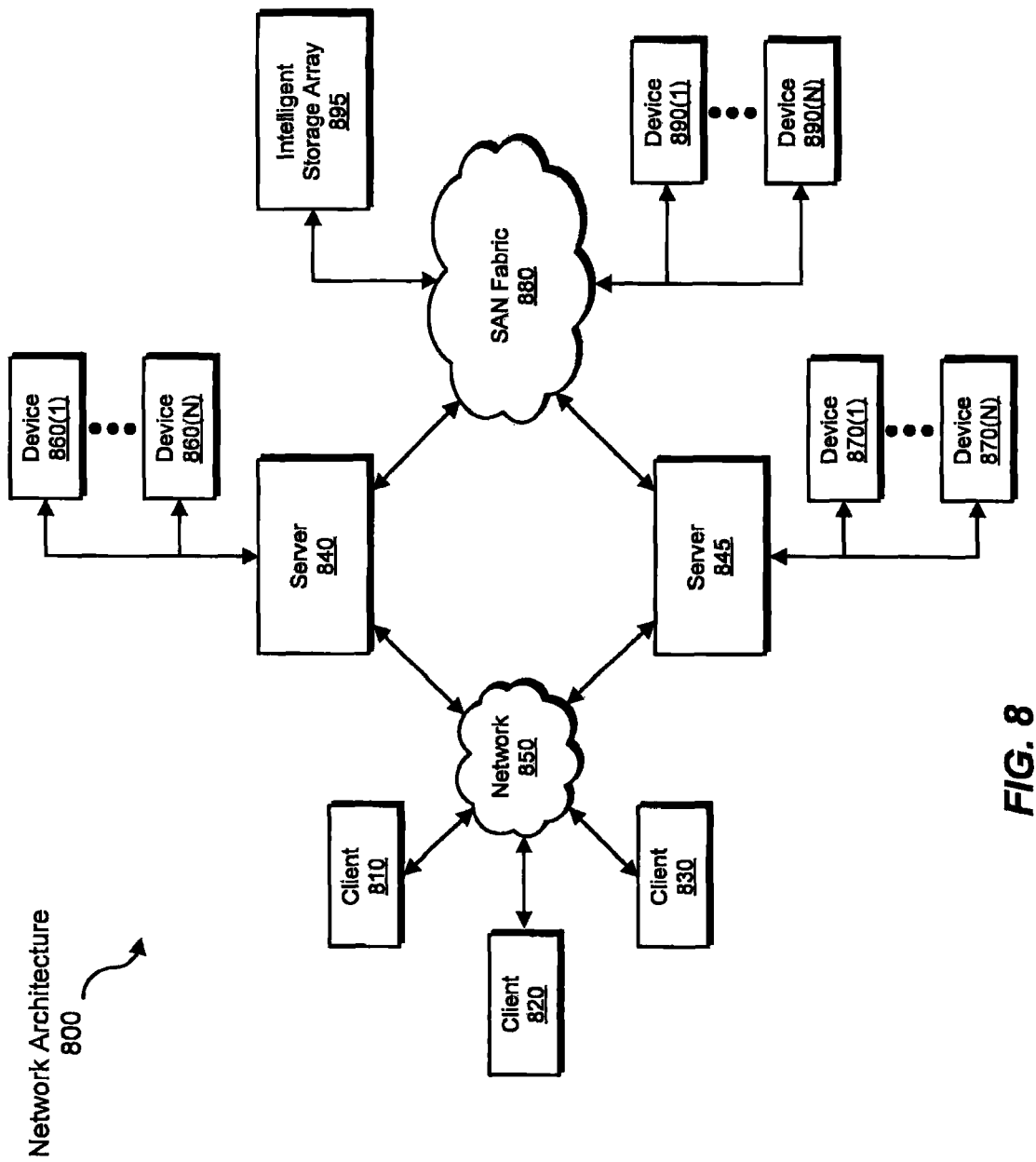
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, creating, associating, scanning, adding, storing, transmitting, and preventing steps disclosed herein. Network architecture 800 may also be used to perform and/or be a means for performing other steps and features set forth in the instant disclosure.

As detailed above, computing system 710 and/or one or more of the components of network architecture 800 may perform and/or be a means for performing either alone or in combination with other elements, one or more of the exemplary methods described and/or illustrated here in. For example, a computer-implemented method for identifying the presence of sensitive data in a backup may comprise identifying a backup, identifying sensitive data in the backup, creating metadata that identifies the presence of the sensitive data in the backup, and associating the metadata with the backup.

In certain embodiments, identifying the sensitive data in the backup may comprise identifying a file in the backup that contains the sensitive data. In this example, identifying the file in the backup that contains the sensitive data may comprise scanning the file before it is added to the backup, identifying the sensitive data in the file, and adding the file to the backup. Identifying the sensitive data in the backup may also comprise identifying a digital signature for the sensitive data in the backup.

In at least one embodiment, associating the metadata with the backup may comprise storing the metadata in the backup. Associating the metadata with the backup may also comprise storing the metadata in a file that is separate from the backup and associating the file with the backup. Metadata may comprise a digital signature for sensitive data and/or information that identifies at least one characteristic of the sensitive data in the backup. Metadata may be encrypted, unencrypted, compressed, and/or uncompressed.

The method may also comprise transmitting a notification to at least one computing system that indicates the presence of sensitive data in the backup. The backup may represent a partial backup, a full backup, an incremental backup, or a differential backup.

In an additional embodiment, a computer-implemented method for preventing sensitive data from being placed in a backup may comprise identifying a file, identifying sensitive data in a file, and preventing the file from being placed in a backup. The method may also comprise transmitting a notification to at least one computing system that indicates the omission of the file from the backup due to the presence of the sensitive data in the file. In addition, identifying the sensitive data in the file may comprise identifying a digital signature for the sensitive data in the file.

In additional embodiments, computing system 710 and/or one or more of the components of network architecture 800 may represent a means for creating, either alone or in combination with other elements, a backup that comprises backup data and metadata that indicates the presence of sensitive data in the backup.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for identifying the presence of sensitive data in backups, at least a portion of the method being performed by a computing system comprising at least one processor, the method comprising:
identifying a backup;
identifying sensitive data in the backup;
creating metadata that identifies both the presence of the sensitive data in the backup and at least one characteristic of the sensitive data;
associating the metadata with the backup to signal the presence of the sensitive data in the backup;
wherein at least a portion of the metadata is stored in a manner that enables the presence of the sensitive data in the backup to be identified even after the backup has been encrypted or compressed.

2. The method of claim 1, wherein identifying the sensitive data in the backup comprises identifying a file in the backup that contains the sensitive data.

3. The method of claim 2, wherein identifying the file in the backup that contains the sensitive data comprises:
scanning the file before it is added to the backup;
identifying the sensitive data in the file.

4. The method of claim 1, wherein identifying the sensitive data in the backup comprises identifying a digital signature for the sensitive data in the backup.

5. The method of claim 1, wherein associating the metadata with the backup comprises storing the metadata in the backup.

6. The method of claim 1, wherein associating the metadata with the backup comprises:
storing the metadata in a file that is separate from the backup;
associating the file with the backup.

7. The method of claim 1, wherein the metadata comprises a digital signature for the sensitive data.

8. The method of claim 1, further comprising transmitting a notification to at least one other computing system that indicates the presence of the sensitive data in the backup.

9. The method of claim 1, wherein at least a portion of the metadata is stored in an unencrypted and uncompressed format.

10. The method of claim 1, further comprising preventing, based on the metadata that identifies the presence of the sensitive data in the backup, the sensitive data from being distributed to an unauthorized location.

11. A system for identifying the presence of sensitive data in backups, the system comprising:
a sensitive-data-detection module programmed to:
identify a backup;
identify sensitive data in the backup;
a metadata module programmed to:
create metadata that identifies both the presence of the sensitive data in the backup and at least one characteristic of the sensitive data;
associate the metadata with the sensitive data identified in the backup to signal the presence of the sensitive data in the backup;
wherein at least a portion of the metadata is stored in a manner that enables the presence of the sensitive data in the backup to be identified even after the backup has been encrypted or compressed;
at least one processor configured to execute the sensitive-data-detection module and the metadata module.

12. The system of claim 11, wherein at least a portion of the metadata is stored in an unencrypted and uncompressed format.

13. A non-transitory computer-readable medium containing information that identifies the presence of sensitive data in a backup, the non-transitory computer-readable medium comprising:
backup data that comprises sensitive data;
metadata that identifies both the presence of the sensitive data in the backup data and at least one characteristic of the sensitive data;
wherein the metadata is associated with the backup data to signal the presence of the sensitive data in the backup data;
wherein at least a portion of the metadata is stored in a manner that enables the presence of the sensitive data in the backup data to be identified even after the backup data has been encrypted or compressed.

14. The non-transitory computer-readable medium of claim 13, wherein the metadata comprises a digital signature for the sensitive data.

15. The non-transitory computer-readable medium of claim 13, wherein the metadata is stored in at least one of:
the backup data;
a file that is separate from the backup data.

16. The non-transitory computer-readable medium of claim 13, wherein at least a portion of the metadata is stored in an unencrypted and uncompressed format.

17. The non-transitory computer-readable medium of claim 13, wherein the backup data comprises at least one of:
a partial backup;
a full backup;
an incremental backup;
a differential backup.

* * * * *